(12) United States Patent
Åström et al.

(10) Patent No.: US 8,507,144 B2
(45) Date of Patent: Aug. 13, 2013

(54) METHOD AND ARRANGEMENT FOR CONTROLLING FUEL FEED IN THE FUEL CELL SYSTEM

(75) Inventors: Kim Åström, Kirkkonummi (FI); Toni Ollikainen, Espoo (FI)

(73) Assignee: Convion Oy, Espoo (FI)

( * ) Notice: Subject to any disclaimer, the term of this patent is extended or adjusted under 35 U.S.C. 154(b) by 0 days.

(21) Appl. No.: 13/640,445

(22) PCT Filed: Mar. 8, 2011

(86) PCT No.: PCT/FI2011/050201
§ 371 (c)(1),
(2), (4) Date: Oct. 10, 2012

(87) PCT Pub. No.: WO2011/128498
PCT Pub. Date: Oct. 20, 2011

(65) Prior Publication Data
US 2013/0034791 A1   Feb. 7, 2013

(30) Foreign Application Priority Data
Apr. 12, 2010  (FI) .................................. 20105377

(51) Int. Cl.
*H01M 8/04*  (2006.01)
(52) U.S. Cl.
USPC ........................................ 429/443; 429/433
(58) Field of Classification Search
None
See application file for complete search history.

(56) References Cited

U.S. PATENT DOCUMENTS

| | | | |
|---|---|---|---|
| 6,655,130 B1 * | 12/2003 | Kirwan et al. | 60/284 |
| 6,979,508 B2 * | 12/2005 | Gurin et al. | 429/415 |
| 7,258,936 B2 * | 8/2007 | Zheng et al. | 429/440 |
| 7,422,810 B2 * | 9/2008 | Venkataraman et al. | 429/411 |
| 7,521,139 B2 * | 4/2009 | Foger | 429/412 |

(Continued)

FOREIGN PATENT DOCUMENTS

| | | |
|---|---|---|
| JP | 2009-110666 A | 5/2009 |
| WO | WO 03/107463 A2 | 12/2003 |

OTHER PUBLICATIONS

International Search Report (PCT/ISA/210) issued on Jul. 4, 2011, by the Finnish Patent Office as the International Searching Authority for International Application No. PCT/FI2011/050201.

(Continued)

*Primary Examiner* — Patrick Ryan
*Assistant Examiner* — Jose Colucci Rios
(74) *Attorney, Agent, or Firm* — Buchanan Ingersoll & Rooney PC

(57) ABSTRACT

Exemplary embodiments are directed to a fuel cell system that is fed fuel and provided information on the fed fuel. The system generates information about fuel utilization in the fuel cells and oxygen to carbon ratio (O/C ratio) in the fuel cell system process and includes features for controlling a loading of the fuel cells. The fuel cell system also includes a first closed loop controller for controlling the feeding of fuel by taking into account the fuel utilization information as process feedback information, and by implementing a constraint function taking control of O/C ratio by restricting output of the first controller when said O/C ratio deviates from an allowed range, and a second controller for controlling active fuel cell loading by implementing a constraint function taking control of fuel utilization restricting output of the second controller when said fuel utilization deviates from an allowed range.

15 Claims, 3 Drawing Sheets

(56) References Cited

U.S. PATENT DOCUMENTS

| | | |
|---|---|---|
| 2003/0224230 A1 | 12/2003 | Stocker |
| 2009/0305087 A1* | 12/2009 | Rajashekara et al. ........... 429/13 |
| 2010/0003558 A1 | 1/2010 | Evans et al. |
| 2010/0055515 A1 | 3/2010 | Lai et al. |

OTHER PUBLICATIONS

International Preliminary Report on Patentability (PCT/IPEA/409) issued on Aug. 14, 2012, by the Finnish Patent Office as the International Searching Authority for International Application No. PCT/FI2011/050201.

Search Report issued on Feb. 21, 2011, by the Finnish Patent Office for Application No. 20105377.

JP Office Action issued on Mar. 15, 2013, by the Japanese Patent Office (JPO) in Japanese Patent Application No. 2013-504301 with English Translation.

* cited by examiner

METHOD AND ARRANGEMENT FOR CONTROLLING FUEL FEED IN THE FUEL CELL SYSTEM

THE FIELD OF THE INVENTION

Most of the energy of the world is produced by means of oil, coal, natural gas or nuclear power. All these production methods have their specific problems as far as, for example, availability and friendliness to environment are concerned. As far as the environment is concerned, especially oil and coal cause pollution when they are combusted. The problem with nuclear power is, at least, storage of used fuel.

Especially because of the environmental problems, new energy sources, more environmentally friendly and, for example, having a better efficiency than the above-mentioned energy sources, have been developed. Fuel cell device are promising future energy conversion device by means of which fuel, for example bio gas, is directly transformed to electricity via a chemical reaction in an environmentally friendly process.

THE STATE OF THE ART

Figure 1:
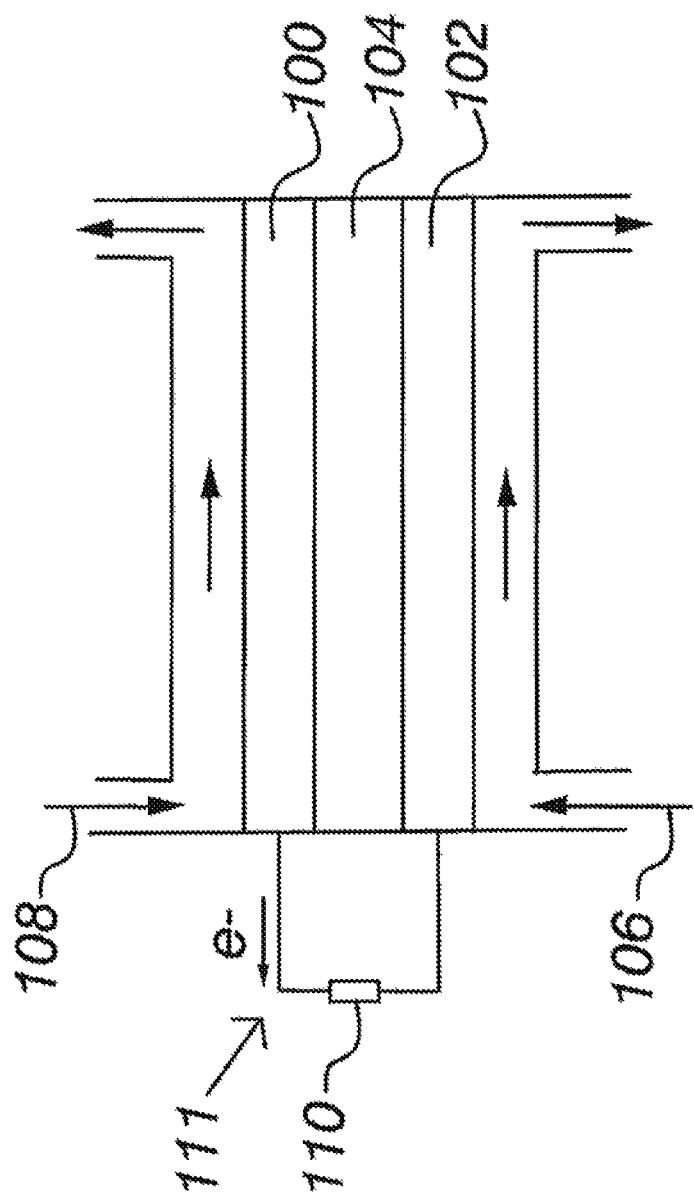

Fuel cell, as presented in FIG. 1, comprises an anode side 100 and a cathode side 102 and an electrolyte material 104 between them. In fuel cells oxygen 106 is fed to the cathode side 102 and it is reduced to a negative oxygen ion by receiving electrons from the cathode. The negative oxygen ion goes through the electrolyte material 104 to the anode side 100 where it reacts with fuel 108 producing water and also typically carbon dioxide ($CO_2$). Between anode 100 and cathode 102 is an external electric circuit 111 comprising a load 110 for the fuel cell.

Figure 2:
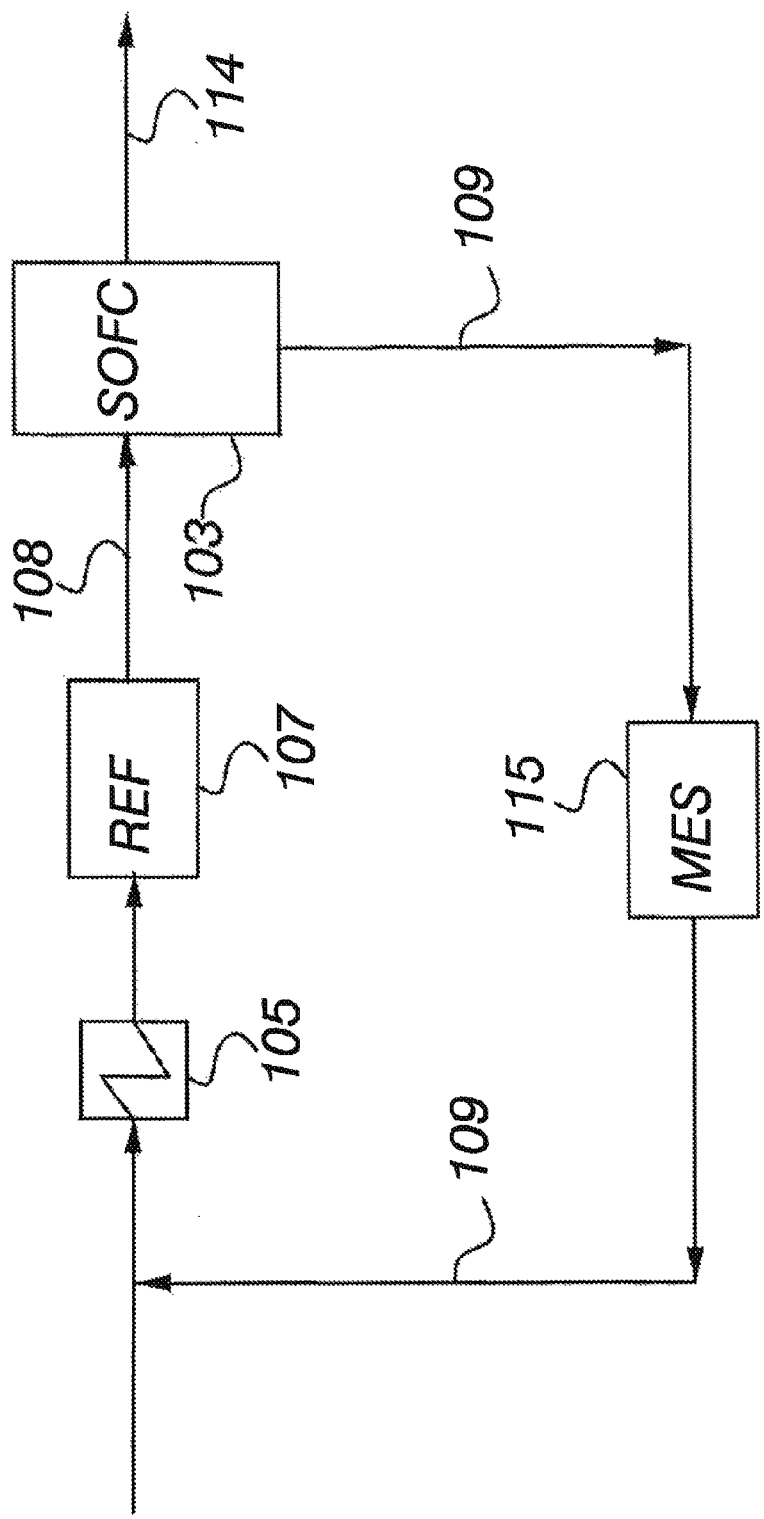

In FIG. 2 is presented a SOFC device as an example of a high temperature fuel cell device. SOFC device is an electrochemical conversion device that produces electricity directly from oxidizing a fuel. SOFC device can utilize as fuel for example natural gas, bio gas, methanol or other compounds containing hydrocarbon mixtures. SOFC device in FIG. 2 comprises more than one, typically plural of fuel cells in stack formation 103 i.e. in a SOFC stack, and there are typically a couple of these stacks 103 in one SOFC device. Each fuel cell comprises anode 100 and cathode 102 structure as presented in FIG. 1. Part of the used fuel is recirculated in feedback arrangement 109. SOFC device in FIG. 2 also comprises a fuel heat exchanger 105 and a reformer 107. Heat exchangers are used for controlling thermal conditions in fuel cell process and there can be located more than one of them in different locations of SOFC device. The extra thermal energy in circulating gas is recovered in one or more heat exchanger 105 to be utilized in SOFC device or outside in a heat recovering unit. Reformer 107 is a device that converts the fuel such as for example natural gas to a composition suitable for fuel cells, for example to a composition containing hydrogen and methane, carbondioxide, carbon monoxide and inert gases. Anyway in each SOFC device it is though not necessary to have a reformer.

By using measurement means 115 (such as fuel flow meter, current meter and temperature meter) is carried out necessary measurements for the operation of the SOFC device from the through anode recirculating gas. Only part of the gas used at anodes 100 is recirculated through anodes in feedback arrangement 109 and the other part of the gas is exhausted 114 from the anodes 100.

Advantages of SOFC device include high efficiencies, long term stability, low emissions, and low cost. The main disadvantage is the high operating temperature which results in long start up times and both mechanical and chemical compatibility issues.

In non dead-end operated fuel cell systems, fuel feed must be adjusted in accordance with the fuel cell loading in order to maintain the fuel utilization (FU) rate at a desired level. In SOFC systems, in addition to said fuel utilization demand, the oxygen-to-carbon (OC) ratio must be maintained sufficiently high by means of e.g. anode recirculation, partial oxidation or external water feed to ensure that solid carbon formation would not take place. Typically, the control of fuel feed, water balance and possible other feeds and fuel cell loading is based on manual set points or predefined setting groups or parameter correlations. These methods of controlling are adequate when the conditions around and within the system are stable. However, if at least one condition changes, for example there exists in the SOFC system fuel composition variations, limited response time of controller(s) or partial or even total loss of capacity in SOFC system device(s), then the ability of these prior art control schemes to respond properly is limited to said pre-defined cases.

SHORT DESCRIPTION OF THE INVENTION

The object of the invention is to accomplish a fuel cell system capable of adapting well and fast enough to internal and/or external changes in operating conditions of the fuel cell system. This can be achieved by a fuel cell system for producing electricity with fuel cells, each fuel cell comprising an anode side, a cathode side, an electrolyte between the anode side and the cathode side. The fuel cell system comprises fuel feeding means for feeding fuel to the fuel cell system and for providing information on the fuel, means for generating information about fuel utilization in the fuel cells and oxygen to carbon ratio (O/C ratio) in the fuel cell system process, active means for controlling loading of the fuel cells, a first closed loop controller for controlling said fuel feeding means by taking into account the fuel utilization information as process feedback information, and by implementing a constraint function taking control of O/C ratio by means of restricting output of the first controller when said O/C ratio deviates from an allowed range, and a second controller for controlling the active fuel cell loading means by implementing a constraint function taking control of fuel utilization by means of restricting output of the second controller when said fuel utilization deviates from an allowed range.

The focus of the invention is also a method for producing electricity in a fuel cell system. In the method is fed fuel to the fuel cell system by providing information on the fuel, is generated information on fuel utilization in the fuel cells and oxygen to carbon ratio (O/C ratio) in the fuel cell system process, is actively controlled loading of the fuel cells, is controlled the feeding of fuel by taking into account the fuel utilization information as process feedback information, and by implementing a constraint function taking control of O/C ratio by means of restricting a first control output when said O/C ratio deviates from an allowed range, and is actively controlled loading of the fuel cells by implementing a constraint function taking control of fuel utilization by means of restricting a second control output when said fuel utilization deviates from an allowed range.

The invention is based on the utilization of information generated about fuel and fuel utilization in the fuel cells and oxygen to carbon ratio (O/C ratio), and on the active control in loading of the fuel cells. The fuel utilization information is used as process feedback information, and a constraint function is implemented for taking control of O/C ratio by means of restricting output of the first controller when said O/C ratio deviates from an allowed range. Also, in the control of loading of fuel cells a constraint function is implemented for taking control of fuel utilization by means of restricting output of the second controller when said fuel utilization deviates from an allowed range.

The invention provides a control method and arrangement for the fuel cell system operating conditions, inherently capable of responding properly to internal and/or external changes in operating conditions of the fuel cell system such as changes in fuel composition or changes in yield of system components. Unlike prior art implementations, the control method according to the invention, based on valid feedback information such as oxygen to carbon ratio (O/C) and fuel utilization (FU), does not require predefined parameter sets or expectations for various operating conditions.

SHORT DESCRIPTION OF FIGURES

Figure 3:
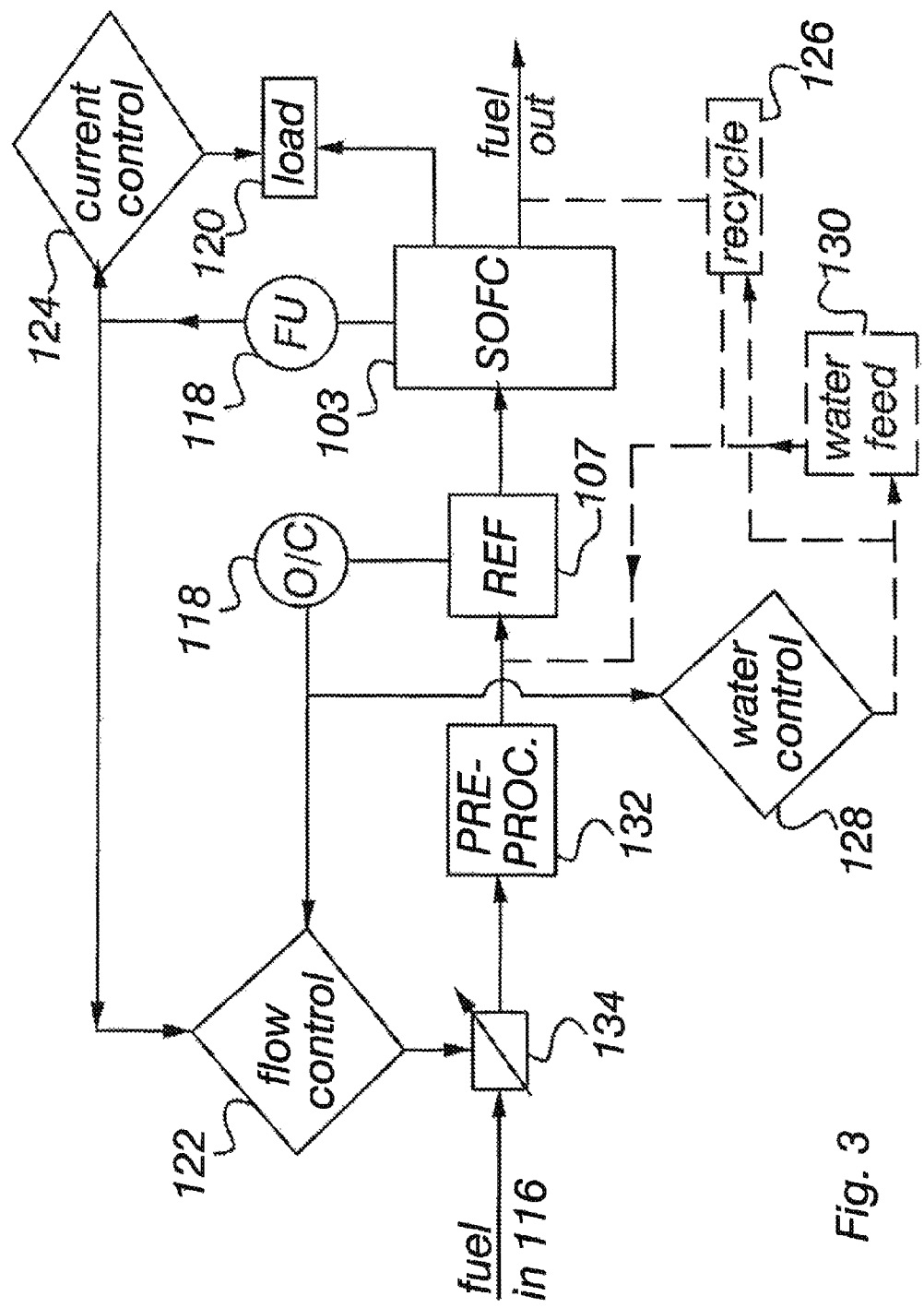

FIG. 1 presents a single fuel cell structure.
FIG. 2 presents an example of a SOFC device.
FIG. 3 presents a preferred embodiment according to the present invention.

DETAILED DESCRIPTION OF THE INVENTION

Solid oxide fuel cells (SOFCs) can have multiple geometries. The planar geometry (FIG. 1) is the typical sandwich type geometry employed by most types of fuel cells, where the electrolyte 104 is sandwiched in between the electrodes, anode 100 and cathode 102. SOFCs can also be made in tubular geometries where for example either air or fuel is passed through the inside of the tube and the other gas is passed along the outside of the tube. This can be also arranged so that the gas used as fuel is passed through the inside of the tube and air is passed along the outside of the tube. The tubular design is better in sealing air from the fuel. Anyway the performance of the planar design is better than the performance of the tubular design however, because the planar design has a lower resistance comparatively. Other geometries of SOFCs include modified planar cells (MPC or MPSOFC), where a wave-like structure replaces the traditional flat configuration of the planar cell. Such designs are promising, because they share the advantages of both planar cells (low resistance) and tubular cells.

The ceramics used in SOFCs do not become ionically active until they reach very high temperature and as a consequence of this the stacks have to be heated at temperatures ranging from 600 to 1,000° C. Reduction of oxygen (FIG. 1) into oxygen ions occurs at the cathode 102. These ions can then be transferred through the solid oxide electrolyte 104 to the anode 100 where they can electrochemically oxidize the gas used as fuel. In this reaction, a water and carbondioxide byproducts are given off as well as two electrons. These electrons then flow through an external circuit 111 where they can be utilized. The cycle then repeats as those electrons enter the cathode material 102 again.

In large solid oxide fuel cell systems typical fuels are natural gas (mainly methane), different biogases (mainly nitrogen and/or carbon dioxide diluted methane), and other higher hydrocarbon containing fuels, including alcohols. Methane and higher hydrocarbons need to be reformed either in the reformer 107 (FIG. 2) before entering the fuel cell stacks or (partially) internally within the stacks 103. The reforming reactions require certain amount of water, and additional water is also needed to prevent possible carbon formation (coking) caused by higher hydrocarbons. This water can be provided internally by recirculating the anode gas exhaust flow, because water is produced in excess amounts in fuel cell reactions, and/or with an auxiliary water feed (e.g. direct fresh water feed or circulation of exhaust condensate). By anode recirculation arrangement also part of the unused fuel and dilutants in anode gas are fed back to the process, whereas in auxiliary water feed arrangement only additive to the process is water.

In the present invention is accomplished a flexible control of critical fuel cell stack operating parameters, such as for example fuel utilization (FU), oxygen to carbon ratio (O/C ratio) and loading of stacks 103, by controlling them on the basis of operation of interactive controllers 122, 124 (FIG. 3). Fuel feed is controlled in a closed loop controller 122 using fuel utilization measurement or calculation as process feedback information. The output of said closed loop controller 122 is constrained, i.e. limited, by an oxygen to carbon (O/C) minimum condition. The closed loop controller 122 drives fuel feeding means 116 in order to achieve a specified fuel utilization target. Further the controller 122 is characterized by that it takes as input an O/C-ratio information, fuel utilization set point and/or fuel utilization minimum limit and implements a non-linear constraining function to limit the fuel feed based on the O/C-ratio, if required. The more the O/C-ratio deviates downward from the reference level, the higher is the pull-down rate of the fuel feed in the fuel feeding means 116. The control 120 of stack loads is limited by a similar fuel utilization based constraint in the controller 124. Controllers 122, 124 are preferably arranged in digital processors and they can be located in the same processor or separately in different processors.

The control method according to the invention provides a lean control implementation having inherent capability of responding to sudden condition changes. If e.g. the fuel composition suddenly changes to more diluted fuel, the fuel utilization (FU) constraint in the stack load control 120 (FIG. 3) will, when a need arises, rapidly reduce loading to a safe FU level, where after the system can automatically gradually ramp up towards the desired loading level at a pace determined by the ramping capability of e.g. fuel feed and/or water balance control 128. Similarly a sudden drop in loading may enforce a rapid pull-down of fuel feed triggered by the O/C-ratio constraint in the FU controller 122 in order to achieve a fuel feed level appropriate to maintain sufficient O/C ratio. Thus, by pulling down the fuel feed to maintain sufficient O/C ratio in the anode recirculated system, the method also inherently protects an afterburner, burning the non-recirculated part of the anode off-gas from the drastic rise in feed of combustible species resulting from a full or partial drop of fuel cell loading.

In FIG. 3 is presented a preferred embodiment according to the present invention. The fuel cell system comprises fuel feeding means 116 for feeding fuel to the fuel cell system and for providing information on the fuel, and means 132 for performing preprocessing of fuel before fuel cell stacks 103. A reformer 107, also before fuel cell stacks 103, performs reformer functions as described related to FIG. 2. Means 132 and the reformer 107 are not necessary parts of the preferred embodiment presented in FIG. 3. Means 118 generates information about fuel utilization in the fuel cells 103 and oxygen to carbon ratio (O/C ratio) in the fuel cell system process. Means 118 are for example measurement devices for measuring chemical compositions, but means 118 can be also a processor for generating in a calculative process information about fuel utilization in the fuel cells and information about oxygen to carbon ratio (O/C ratio) in the fuel cell system process. Active means 120 in FIG. 3 for controlling loading of the fuel cells are for example electrical measurement device for measuring loads of fuel cells and device arrangement for actively increasing or decreasing loads of fuel cells on the basis of said measurements.

The preferred embodiment in FIG. 3 further comprises a first closed loop controller 122 for controlling said fuel feeding means 116 by taking into account the fuel utilization information as process feedback information, and by implementing a constraint function taking control of O/C ratio by means of restricting output of the first controller 122 when said O/C ratio deviates from an allowed range. Fuel feeding means 116 can be arranged as actively controllable by using for example a controllable choke valve, which can be a mass flow adjuster for adjusting the fuel flow on the basis of said fuel utilization information and/or O/C ratio.

A second controller 124 is used for controlling the active fuel cell loading means 120 by implementing a constraint function taking control of fuel utilization by means of restricting output of the second controller 124 when said fuel utilization deviates from an allowed range. Preferably the fuel cell control system comprises means for implementing integral control parameter drift limitation to prevent saturation of the controller during constrained operation. The fuel cell system can also comprise the first closed loop controller 122 and/or the second controller 124 for implementing a ramp limitation function for the controller output to facilitate smooth transition from constrained operation back to normal closed loop operation. The second controller 124 can be a closed loop controller, but the closed loop is not necessary for example in an embodiment where current controlled power electronics is used as load.

The system part 134 in FIG. 3 realizes changes to fuel feed-in determined by the first closed loop controller 122. In the preferred embodiment of the invention is possible to feed by the fuel feeding means 116 such fuel to the fuel cell system, which fuel comprises different chemical composition at different points of time, and also said means 116 provides information on said fuel at different points of time. An example of such fuel is biogas.

The fuel cell system according to the invention can comprise means for recirculating 126 the supplied fuel, or part of it, at anode sides 100, but the invention can also be utilized in fuel cell systems, which do not have recirculation of fuel at anode sides. Also auxiliary water feed 130 is not necessary in each fuel cell system.

As well as with SOFCs the present invention can also be utilized with MCFCs (Molten Carbonate Fuel Cells) and other high temperature fuel cells that operate at 400° C. and higher temperatures. MCFCs are high-temperature fuel cells that use an electrolyte composed of a molten carbonate salt mixture suspended in a porous, chemically inert ceramic matrix of BASE, Beta-Alumina Solid Electrolyte.

Although the invention has been presented in reference to the attached figures and specification, the invention is by no means limited to those as the invention is subject to variations within the scope allowed for by the claims.

The invention claimed is:

1. A high temperature fuel cell system for producing electricity with plural fuel cells, each fuel cell having an anode side, a cathode side, and an electrolyte between the anode side and the cathode side, the high temperature fuel cell system comprising:
    fuel feeding means for feeding fuel to the fuel cells and for providing information on the fuel;
    means for generating information about fuel utilization in the fuel cells and oxygen to carbon ratio (O/C ratio) in the fuel cell system process;
    active means for controlling loading of the fuel cells;
    a first closed loop controller for controlling said fuel feeding means by taking into account the fuel utilization information as process feedback information, and by implementing a constraint function taking control of O/C ratio by restricting output of the first controller when said O/C ratio deviates from an allowed range by falling below a minimum target value in the allowed range; and
    a second controller for controlling the active fuel cell loading means by implementing a constraint function taking control of fuel utilization by restricting output of the second controller when said fuel utilization deviates from an allowed range by exceeding a target value in the allowed range.

2. The fuel cell system in accordance with claim 1, comprising:
    means for recirculating the supplied fuel at anode sides.

3. The fuel cell system in accordance with claim 1, comprising:
    means for generating in a calculative process information about fuel utilization in the fuel cells and information about oxygen to carbon ratio (O/C ratio) in the fuel cells.

4. The fuel cell system in accordance with claim 1, wherein the fuel feeding means are arranged as actively controllable.

5. The fuel cell system in accordance with claim 1, wherein at least one of the first closed loop controller and the second controller for implementing integral control parameter drift limitation to limit drifting of the control parameter values in order to prevent saturation of the at least one controller during constrained operation.

6. The fuel cell system in accordance with claim 1, wherein at least one of the first closed loop controller and the second controller for implementing a ramp limitation function for the at least one controller output to limit control ramp values in order to facilitate smooth transition from constrained operation back to normal closed loop operation.

7. The fuel cell system in accordance with claim 1, wherein the fed fuel comprises different chemical composition at different points in time, and information on said fuel is provided at each different point in time.

8. A method for producing electricity in a high temperature fuel cell system, comprising:
    feeding fuel to the high temperature fuel cell system by providing information on the fuel;
    generating information on fuel utilization in the fuel cells and oxygen to carbon ratio (O/C ratio) in the fuel cell system process flow;
    controlling loading of the fuel cells;
    controlling the feeding of fuel by taking into account the fuel utilization information as process feedback information, and by implementing a constraint function taking control of O/C ratio by restricting a first control output when said O/C ratio deviates from an allowed range by falling below a minimum target value in the allowed range; and
    controlling loading of the fuel cells by implementing a constraint function taking control of fuel utilization by restricting a second control output when said fuel utilization deviates from an allowed range by exceeding a target value in the allowed range.

9. The method in accordance with claim 8, wherein the supplied fuel is recirculated at anode sides.

10. The method in accordance with claim 8, using calculative process information about fuel utilization in the fuel cells and about oxygen to carbon ratio (O/C ratio) in the fuel cells.

11. The method in accordance with claim 8, wherein the feeding of fuel is actively controlled.

12. The method in accordance with claim 8, comprising:
using an integral control parameter drift limitation to limit drifting of the control parameter values in order to prevent saturation of the at least one control output during constrained operation.

13. The method in accordance with claim 8, comprising:
using a ramp limitation function for the at least one control output to limit control ramp values in order to facilitate transition from constrained operation back to normal closed loop operation.

14. The method in accordance with claim 8, wherein the fed fuel comprises different chemical composition at different points in time, and information is provided on said fed fuel at each different point in time.

15. A high temperature fuel cell system for producing electricity with plural fuel cells, each fuel cell having an anode side, a cathode side, and an electrolyte between the anode side and the cathode side, the high temperature fuel cell system comprising:

a feeder that feeds fuel to the fuel cells and for providing information on the fuel;

a processor that generates information about fuel utilization in the fuel cells and oxygen to carbon ratio (O/C ratio) in the fuel cell system process;

an active controller that controls a loading of the fuel cells;

a first closed loop controller that controls said fuel feeding means by taking into account the fuel utilization information as process feedback information, and by implementing a constraint function taking control of O/C ratio by restricting output of the first controller when said O/C ratio deviates from an allowed range by falling below a minimum target value in the allowed range; and a second controller that controls the active controller by implementing a constraint function taking control of fuel utilization by restricting output of the second controller when said fuel utilization deviates from an allowed range by exceeding a target value in the allowed range.

* * * * *